US011383710B2

(12) United States Patent
Tsuchida et al.

(10) Patent No.: US 11,383,710 B2
(45) Date of Patent: Jul. 12, 2022

(54) CONTROL APPARATUS FOR VEHICLE

(71) Applicant: DENSO CORPORATION, Kariya (JP)

(72) Inventors: Norio Tsuchida, Kariya (JP); Youhei Masui, Kariya (JP)

(73) Assignee: DENSO CORPORATION, Kariya (JP)

(*) Notice: Subject to any disclaimer, the term of this patent is extended or adjusted under 35 U.S.C. 154(b) by 86 days.

(21) Appl. No.: 16/854,032

(22) Filed: Apr. 21, 2020

(65) Prior Publication Data

US 2020/0339118 A1 Oct. 29, 2020

(30) Foreign Application Priority Data

Apr. 23, 2019 (JP) ............................ JP2019-081472

(51) Int. Cl.
*B60W 30/16* (2020.01)
*B60W 30/18* (2012.01)

(52) U.S. Cl.
CPC ...... *B60W 30/16* (2013.01); *B60W 30/18163* (2013.01)

(58) Field of Classification Search
CPC .................................................... B60W 30/16
See application file for complete search history.

(56) References Cited

U.S. PATENT DOCUMENTS 7,925,415 B2* 4/2011 Kudo .................... B60W 30/16 318/587
2009/0060647 A1* 3/2009 Denison .................... E01C 1/02 404/1
2013/0268174 A1* 10/2013 Koshizen ................. G08G 1/00 701/96
2017/0151958 A1* 6/2017 Sakuma ............. G01C 21/3664
2017/0183013 A1 6/2017 Matsumoto et al.
2017/0327120 A1* 11/2017 Oh ........................ B60W 30/09
2018/0170384 A1 6/2018 Masui et al.
2019/0023273 A1* 1/2019 Ishioka ................. B60W 30/10
2019/0202457 A1* 7/2019 Kito ................ B60W 30/18163
2019/0287397 A1* 9/2019 Wiebel-Herboth .... G08G 1/091
2019/0329777 A1* 10/2019 Rajab ..................... G08G 1/167
2019/0382019 A1* 12/2019 Abe .................... B60W 30/143
2019/0384305 A1* 12/2019 Niibo .................... B60W 30/14
2019/0385459 A1* 12/2019 Mizoguchi ........ B60W 60/0015
2020/0239031 A1* 7/2020 Ran ...................... G08G 1/0145
2020/0324766 A1* 10/2020 Zhao ..................... B60W 30/16
2020/0398838 A1* 12/2020 Oguro .................. B60W 30/16
2021/0188268 A1* 6/2021 Goto ...................... B60K 31/00
2021/0276561 A1* 9/2021 Hayakawa ......... B62D 15/0255

FOREIGN PATENT DOCUMENTS

JP 2016-134092 A 7/2016
JP 2017-114431 A 6/2017

* cited by examiner

*Primary Examiner* — Redhwan K Mawari
(74) *Attorney, Agent, or Firm* — Maschoff Brennan

(57) ABSTRACT

A vehicle control apparatus performing an automatic driving of a vehicle includes: a vehicle information acquiring unit that acquires vehicle information related to a nearby vehicle; a setting unit that sets an intervehicle margin between the vehicle and the nearby vehicle by using the vehicle information, and determines a change timing of a travelling speed of the vehicle depending on the intervehicle margin; and a driving control unit that performs in a lane change operation, a control of changing the travelling speed of the vehicle at the change timing, and a control of an intervehicle distance between the vehicle and a preceding vehicle of the vehicle after the lane change operation.

9 Claims, 6 Drawing Sheets

CONTROL APPARATUS FOR VEHICLE

CROSS-REFERENCE TO RELATED APPLICATION

This application is based on and claims the benefit of priority from earlier Japanese Patent Application No. 2019-081472 fled Apr. 23, 2019, the description of which is incorporated herein by reference.

BACKGROUND

Technical Field

The present disclosure relates to control apparatus for vehicles.

Description of the Related Art

As a control apparatus for a vehicle, an apparatus that controls a travelling speed of the vehicle when the vehicle changes travelling lane is known. The apparatus controls the travelling speed before/after changing the traveling lane.

SUMMARY

The present disclosure provides a vehicle control apparatus performing an automatic driving of a vehicle including a vehicle information acquiring unit that acquires vehicle information related to a nearby vehicle; a setting unit that sets an intervehicle margin between the vehicle and the nearby vehicle, and determines a change timing of a travelling speed of the vehicle; and a driving control unit that performs a control of changing the travelling speed of the vehicle at the change timing, and a control of an intervehicle distance between the vehicle and a preceding vehicle of the vehicle.

DETAILED DESCRIPTION OF THE PREFERRED EMBODIMENTS

According to a conventional apparatus for controlling a vehicle, for example, Japanese Patent Application Publication No. 2017-114431 discloses a technique in which the travelling speed of the vehicle is determined based on a lower one of a travelling speed of a preceding vehicle in the travelling lane before the own vehicle changes the travelling lane, and a travelling speed of the preceding vehicle in the travelling lane after the own vehicle changes lane.

However, for example, in the case where after the own vehicle changes the travelling lane, when a following vehicle is present in the changed travelling lane, and the own vehicle decelerates earlier during the travelling lane change, the inter-vehicle distance between the own vehicle and the following vehicle may become significantly narrower. Hence, a technique is required to appropriately change the travelling speed of the vehicle in a timely manner during a lane change operation.

Hereinafter, with reference to the drawings, embodiments of the present disclosure will be described.

First Embodiment

Figure 1:
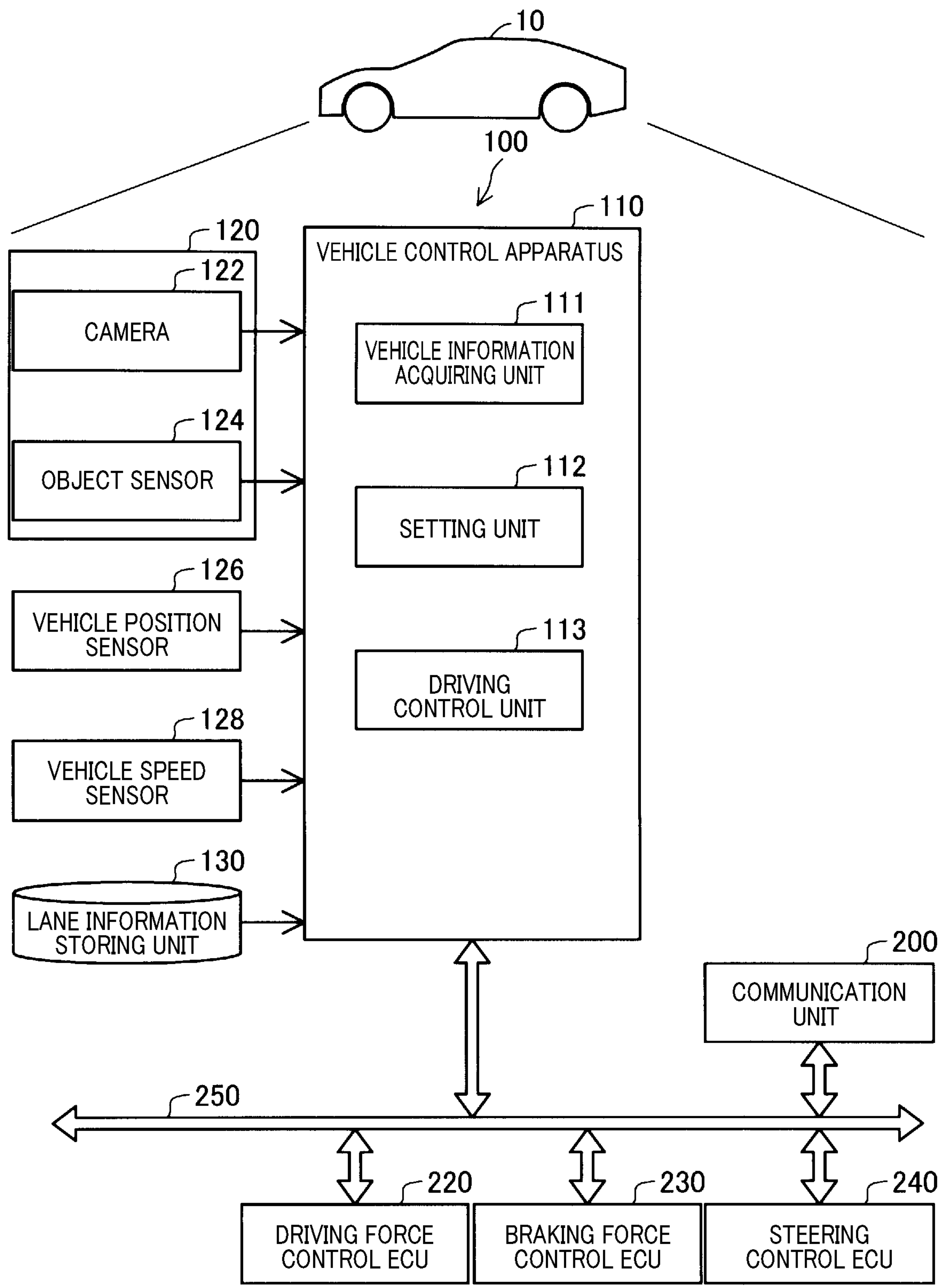
FIG. 1 is an overall block diagram showing an automatic driving system.

As shown in FIG. 1, a vehicle 100 is provided with an automatic driving control system 100. In the present embodiment, the automatic driving control system 100 executes automatic driving of the vehicle 100. According to the present embodiment, the automatic driving control system 100 is provided with a vehicle control apparatus 110, a surrounding sensor 120, a vehicle position sensor 126, a vehicle speed sensor 128, a lane information storing unit 130, a communication unit 200, a driving force control ECU (electronic control unit) 220, a braking force control ECU 230 and a steering control ECU 240. The vehicle control apparatus 110, a driving control unit 113, the driving force control ECU 220, the braking force control ECU 230, the steering control ECU 240 are connected by an on-vehicle network 250. Note that the vehicle 10 may be driven manually by a driver without performing automatic driving.

The surrounding sensor 120 is provided with a camera 122 and an object sensor 124. The camera 122 captures surroundings of the own vehicle and acquires the image thereof. The object sensor 124 detects state of the surroundings of the own vehicle. As the object sensor 124, for example, sensors such as a laser radar, a millimeter wave radar and an ultrasonic radar sensor which uses reflection waves can be employed. According to the present embodiment, the surrounding sensor 120 detects surrounding information of a forward area, a lateral area and a backward area of the vehicle 100.

The vehicle position sensor 126 detects current vehicle position of the vehicle 10. As the vehicle position sensor 126, for example, global navigation satellite system (s), (i.e. GNSS) or a gyro sensor can be used.

The vehicle speed sensor 128 detects the travelling speed of the vehicle 10. As the vehicle speed sensor 128, for example, an acceleration sensor or a wheel speed sensor are employed.

The lane information storing unit 130 stores the lane information of a lane on which the vehicle plans to travel. The lane information includes, for example, information indicating a type of lane such as a driving lane and a passing lane.

The vehicle control apparatus 110 is provided with a vehicle information acquiring unit 111, a setting unit 112 and a driving control unit 113. The vehicle control apparatus 110 is configured of a microcomputer including a central processing unit (i.e. CPU), RAM and ROM, and executes a program installed in advance, thereby achieving respective functions. However, a hardware circuit may be utilized to achieve a part of or all of respective functions.

The vehicle information acquiring unit 111 acquires vehicle information related to a nearby vehicle by using the detection signals of the surrounding sensor 120. More specifically, the vehicle information acquiring unit 111 recognizes the vehicle information which is at least one of an intervehicle distance between the vehicle and the nearby vehicle, a relative speed between the vehicle and the nearby vehicle, a relative acceleration between the vehicle, the nearby vehicle which are detected by the surrounding sensor 120, and a vehicle speed detected by the vehicle speed sensor 128. The vehicle information acquiring unit 111 detects, based on the image captured by the camera 122 and the detection result of the object sensor 123, presence of the nearby vehicle, size of the nearby vehicle, a distance to the nearby vehicle, a travelling direction of the nearby vehicle, a travelling speed of the nearby vehicle, a yaw angular speed of the nearby vehicle and the like. The vehicle information acquiring unit 111 may detect a part of or all of this information by using the intervehicle communication with the nearby vehicle.

The setting unit 112 sets an intervehicle margin by using the vehicle information acquired by the vehicle information acquiring unit 111, and determines, depending on the intervehicle margin, a change timing at which the travelling speed of the vehicle is changed when performing the lane change operation. According to the present embodiment, the intervehicle margin represents a margin such that the larger the value, the larger the margin between the vehicle and the nearby vehicle is.

For example, when the intervehicle distance between the vehicle and the nearby vehicle is large, the setting unit 112 sets the intervehicle margin to be larger than that when the intervehicle distance between the vehicle and the nearby vehicle is small.

Further, in the case where the nearby vehicle as an object to be detected is running ahead of the own vehicle, assuming a case where the nearby vehicle is running at a travelling speed higher than the own vehicle is set to be positive, and a case where the nearby vehicle is running at a travelling speed lower than the own vehicle is set to be negative, when the relative speed between the vehicle and the nearby vehicle is large, the intervehicle margin is set to be larger than a case where the relative speed between the vehicle and the nearby vehicle is small.

Furthermore, assuming a case where an acceleration of the nearby vehicle is higher than that of the own vehicle is set to be positive, and a case where an acceleration of the nearby vehicle is lower than that of the own vehicle is set to be negative, when the relative acceleration between the vehicle and the nearby vehicle is large, the intervehicle margin is set to be larger than a case where the relative acceleration between the vehicle and the nearby vehicle is small.

Moreover, in the case where the nearby vehicle as an object is running behind the own vehicle, assuming a case where the travelling speed of the nearby vehicle is higher than that of an the own vehicle is set to be positive, and a case where the travelling speed of the nearby vehicle is lower than that of the own vehicle is set to be negative, when the relative acceleration between the vehicle and the nearby vehicle is small, the intervehicle margin is set to be larger than a case where the relative acceleration between the vehicle and the nearby vehicle is large.

Assuming a case where an acceleration of the nearby vehicle is higher than that of the own vehicle is set to be positive, and a case where an acceleration of the nearby vehicle is lower than that of the own vehicle is set to be negative, when the relative acceleration between the vehicle and the nearby vehicle is small, the intervehicle margin is set to be larger than a case where the relative acceleration between the vehicle and the nearby vehicle is large. The detailed setting for the timing will be described later.

The driving control unit 113 controls the driving force control ECU 220, the braking force control ECU 230, and the steering control ECU 240, thereby accomplishing an automatic driving function. The driving control unit 113 controls the driving force control ECU 220 and the braking force control ECU 230 and uses the steering control ECU 240, whereby the lane change operation is performed.

The driving force control ECU 220 serves as an electronic control unit that controls an actuator producing the driving force of the vehicle such as an engine. When the driver operates the vehicle manually, the driving force control ECU 220 controls a power source such as an engine or an electric motor, depending on an operation input for the accelerator pedal. On the other hand, when performing an automatic driving, the driving force control ECU 220 controls the power source based on the required driving force calculated by the driving control unit 113.

The braking force control ECU 230 serves as an electronic control unit that controls a brake actuator producing a braking force of a vehicle. When the driver drives the vehicle manually, the braking force control ECU 230 controls the brake actuator depending on an operation input for the brake pedal. On the other hand, when performing the automatic driving operation, the braking force control ECU 230 controls the brake actuator based on the required braking force calculated by the driving control unit 113.

The steering control ECU 240 controls the motor producing the steering torque of the vehicle. When the driver drives the vehicle manually, the steering control ECU 240 controls the motor depending on the operation of the steering wheel to produce an assist torque for the steering operation. Thus, the driver is able to operate the vehicle with a small amount of force, thereby achieving steering of the vehicle. On the other hand, when performing the automatic driving operation, the steering control ECU 240 controls the motor based on the required steering angle calculated by the driving control unit 113.

Figure 2:
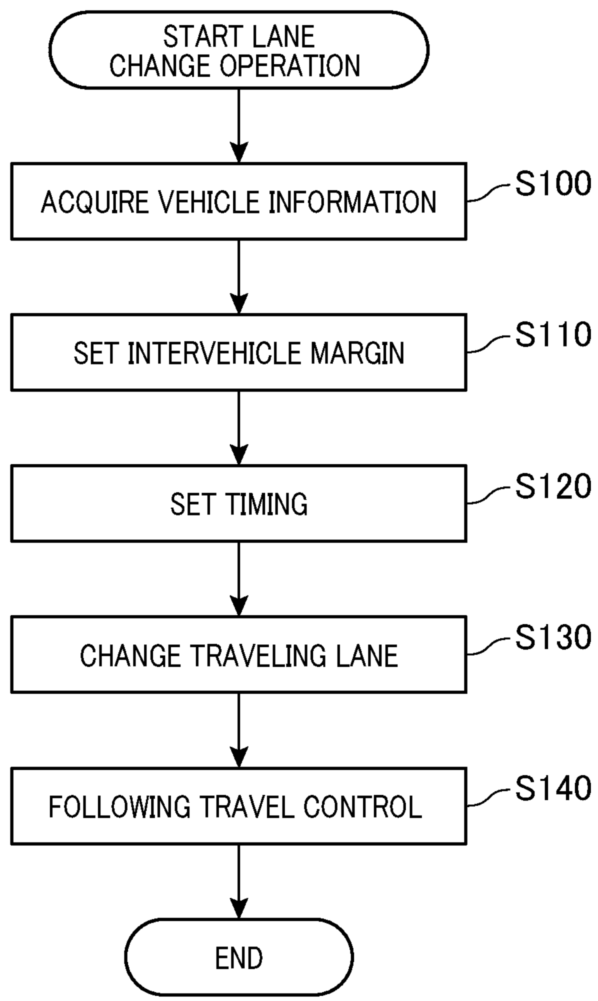
FIG. 2 is a flowchart showing a lane change operation.

A lane change process shown in FIG. 2 is a series of processes in which the vehicle control apparatus 110 performs a driving control of the vehicle 10 for the lane change operation. This process is executed by the vehicle control apparatus 110 when the vehicle 10 performs a lane change operation.

Firstly, the vehicle information acquiring unit 111 acquires vehicle information at step S100. More specifically, the vehicle information acquiring unit 111 acquires vehicle information based on the surrounding image of the vehicle 10 captured by the camera 122 and the surrounding state of the vehicle 10 detected by the object sensor 124. Subsequently, the setting unit 112 sets the intervehicle margin between the vehicle and the nearby vehicle by using the vehicle information acquired at step S100.

Next, the setting unit 112 determines, depending on the intervehicle margin set at the step S110, a change timing at which the travelling speed of the vehicle 10 is changed when performing the lane change operation. According to the present embodiment, the setting unit 112 determines a timing based on any one of the following three cases in which respective positional relationship between the vehicle and the nearby vehicle are different from each other.

<Case 1>

Figure 3:
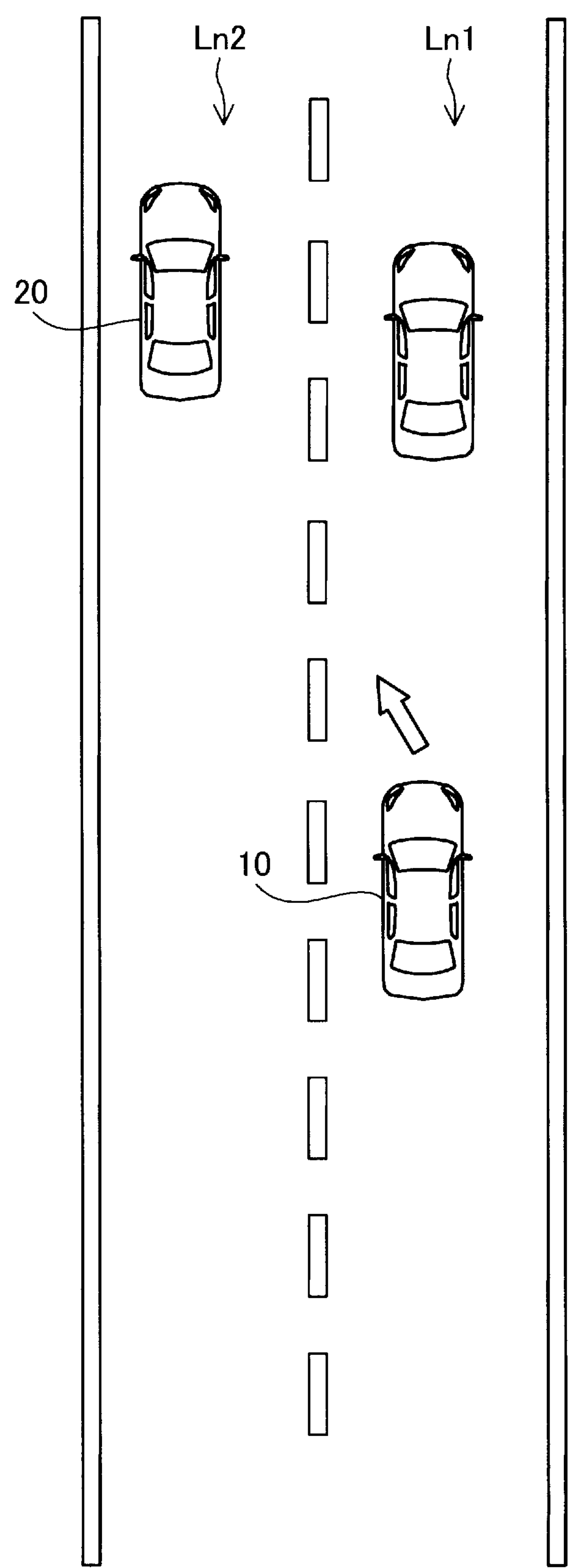
FIG. 3 is an explanatory diagram showing an example of a positional relationship between an own vehicle and nearby vehicle.

As shown in FIG. 3, in the case where a preceding vehicle 20 on the lane Ln2 is determined as a nearby vehicle of the vehicle 10 after changing the travelling lane (i.e. lane change operation), when the intervehicle margin is larger than or equal to a first threshold, the setting unit 112 sets a deceleration timing to be delayed or sets an acceleration timing to be earlier compared to a case where the intervehicle margin is smaller than the first threshold. Thus, when the intervehicle margin is larger, the intervehicle distance between the vehicle 10 and the following vehicle on the lane Ln2 can readily be secured after changing the travelling lane (i.e. lane change operation). The determination whether an acceleration operation or a deceleration operation is performed during the lane change, can be made depending on whether the travelling speed of the preceding vehicle 20 is larger than that of the vehicle 10. In the case where the timing is determined only with the above-described method, the surrounding sensor 120 may only detect the forward area and the lateral area of the vehicle 10.

<Case 2>

Figure 4:
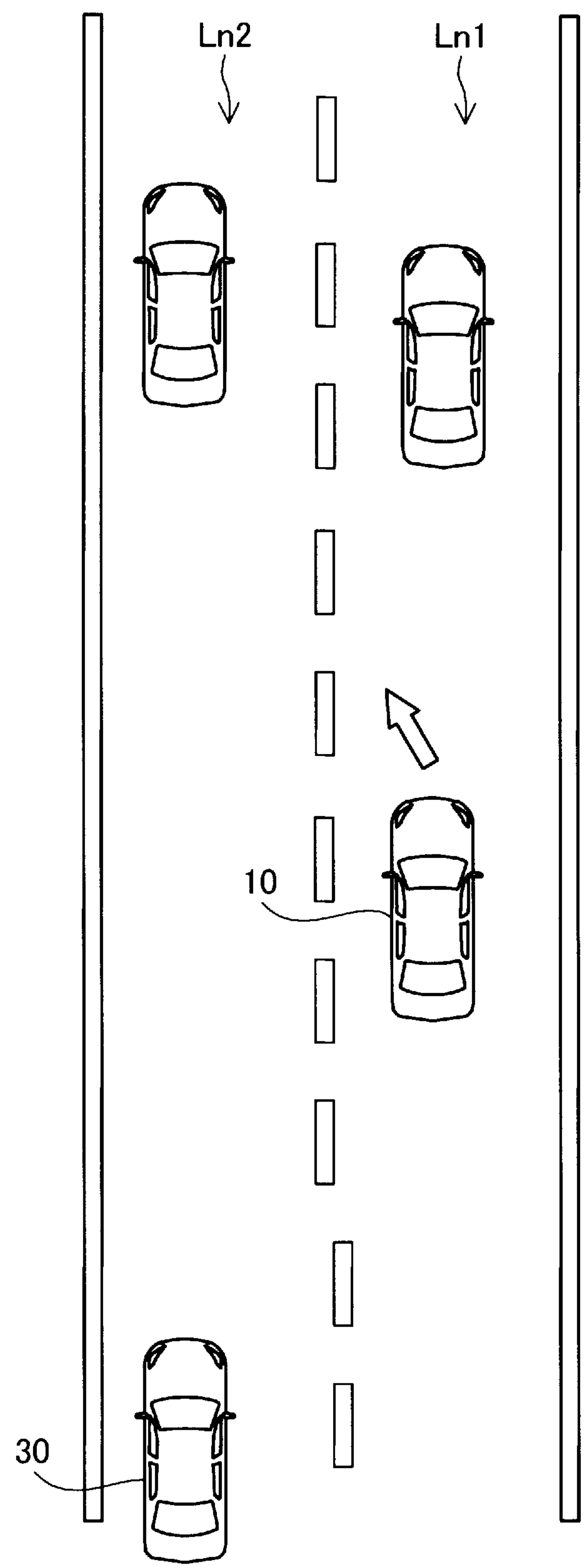
FIG. 4 is an explanatory diagram showing another example of a positional relationship between an own vehicle and nearby vehicle.

As shown in FIG. 4 in the case where the nearby vehicle is defined as a following vehicle 30 on the lane Ln2 after the vehicle 10 changes lane, when the intervehicle margin is smaller than the second threshold, the setting unit 112 sets the deceleration timing to be delayed or sets the acceleration timing to be earlier compared to a case where the intervehicle margin is larger than or equal to the second threshold. Thus, when the intervehicle margin is small, the intervehicle distance between the vehicle 10 and the following vehicle 30 can be prevented from being narrower. Note that the determination of whether an acceleration operation or a deceleration operation is performed is described above.

<Case 3>

Figure 5:
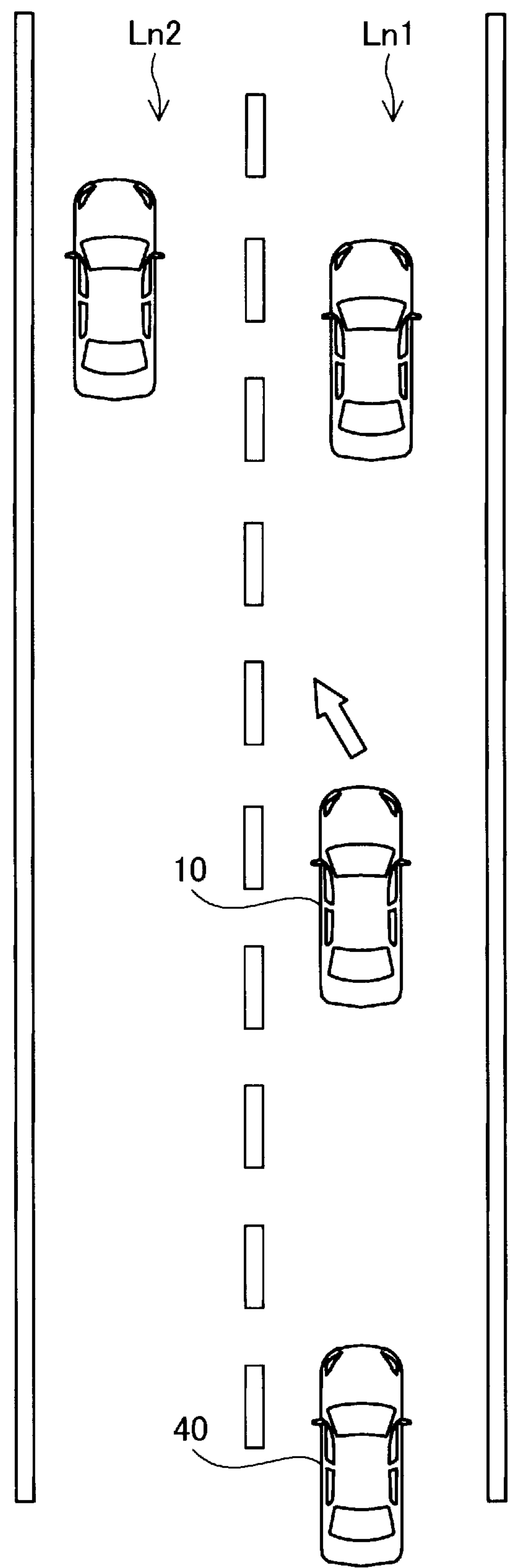
FIG. 5 is an explanatory diagram showing another example of a positional relationship between an own vehicle and nearby vehicle.

As shown in FIG. 5 in the case where the nearby vehicle is defined as a following vehicle 40 on the lane Ln1 before the vehicle 10 changes lane, when the intervehicle margin is smaller than the third threshold, the setting unit 112 sets the deceleration timing to be delayed or sets the acceleration timing to be earlier compared to a case where the intervehicle margin is larger than or equal to the third threshold. Thus, when the intervehicle margin is small, the intervehicle distance between the vehicle 10 and the following vehicle 40 can be prevented from being narrower. Note that the determination of whether an acceleration operation or a deceleration operation is performed is described above.

The above-described cases 1 to 3 can be appropriately combined with other case so as to determine the timing. Each threshold in the above-described cases 1 to 3 is an intervehicle margin capable of avoiding a collision between the vehicle and the nearby vehicle when the travelling speed is changed at a predetermined timing in the lane change operation. Each threshold can be determined through performing a simulation or an experiment in advance. Hereinafter, case 1 will be exemplified in which the vehicle decelerates.

Figure 6:
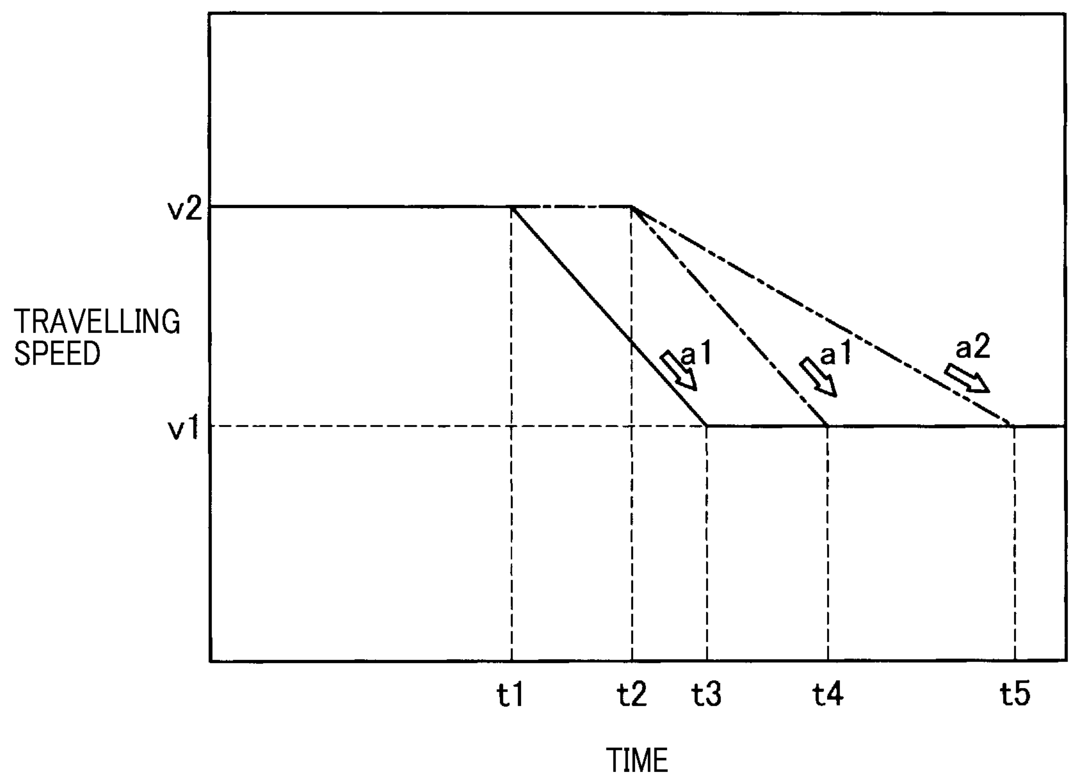
FIG. 6 is a graph showing an example of a travelling speed of the own vehicle and a timing of a travelling speed change during a lane change operation.

As shown in FIG. 6, the setting unit 112 sets, at step S120 (FIG. 2), a timing t1 at which the travelling speed v2 of the vehicle 10 is changed in the lane change. As indicated by a solid line in FIG. 6, the setting unit 112 sets, when the intervehicle margin is smaller than the first threshold, the timing t1 at which the travelling speed v2 is changed to the travelling speed v1. For example, the travelling speed v1 is a travelling speed of the previsiing vehicle after the lane change. The travelling speed v1 may be set to be a predetermined speed when the preceding vehicle is not present after the lane change. The driving control unit 113 controls the vehicle 10 to travel at a deceleration factor a1 from the timing 11, and controls the travelling speed of the vehicle 10 to be changed to v1 from v2 at the timing 3. As shown FIG. 6 with one dot-chain line and two dot-chain line, the setting unit 112, the setting unit 113 sets, when the intervehicle margin is larger than or equal to the first threshold, the timing t2, which is delayed from the timing t1, to be a change timing at which the travelling speed v2 changes to v1. For the sake of convenience, only the one dot-chain line is indicated in the graph during a period from the timing 11 to the timing t2, however, the graph indicated by the one dot-chain line and the graph indicated by the two-dot chain line are duplicated during the period from the timing t1 to the timing t2. The driving control unit 113 may control, as indicated by the one dot-chain line, the vehicle 10 to travel with the deceleration factor a1 as same as the deceleration factor in a period from the timing t2 to the timing t1 such that the travelling speed v2 of the vehicle 10 is changed to the travelling speed v1 at the timing t4 which is delayed from the timing t3, similarly, the driving control unit 113 may control, as indicated by the two dot-chain line, the vehicle 10 to travel with the deceleration factor a2, which is smaller than the deceleration factor a1, from the timing t2 such that the travelling speed v2 of the vehicle 10 is changed to the travelling speed v1 at the timing t5 which is delayed from the timing t4. Note that the driving control unit 113 may control the vehicle 10 to travel with the deceleration factor a2 from the timing t.

Subsequently, the driving control unit 113, at step S130 (FIG. 2), controls the driving force control ECU 220, the braking force control ECU 230, and the steering control ECU 240 such that the vehicle 10 changes lane while changing the travelling speed of the vehicle 10 at the required timing calculated at the step S120.

Lastly, the driving control unit 113 controls, at step S140, the driving force control ECU 220, the braking force control ECU 230, and the steering control ECU 240 such that the vehicle 10 performs a following travel at the above-described travelling speed v1. More specifically, the driving control unit 113 controls an intervehicle distance between the vehicle 10 and the preceding vehicle after changing the travelling lane. Note that the driving control unit 113 utilizes a state of turn signal of the vehicle 10 being turned off, the traveling speed, the steering angle, the yaw rate and the vehicle position of the vehicle 10 to determine completion of the process at step S130, and performs a process at step S140.

According to the vehicle control apparatus 110 of the present embodiment described above, the setting unit 112 determines a timing at which the travelling speed of the vehicle 10 when changing the travelling lane depending on the intervehicle margin which has been set using the vehicle information related to the nearby vehicle. Hence, the travelling speed of the vehicle 10 during the lane change operation can appropriately be changed with timely manner. Also, since the setting unit 112 utilizes vehicle information including at least one of the travelling speed of the vehicle 10, the intervehicle distance between the vehicle 10 and the nearby vehicle, the relative speed between the vehicle 10 and the nearby vehicle, the relative acceleration factor between the vehicle 10 and the nearby vehicle, to determine the intervehicle margin, the intervehicle margin can be determined more accurately.

Other Embodiments

In the above-described embodiments, the setting unit 112 determines the intervehicle margin by utilizing the vehicle information including at least one of the travelling speed of the vehicle, the intervehicle distance between the vehicle and the nearby vehicle, the relative speed between the vehicle and the nearby vehicle, the relative acceleration factor between the vehicle and the nearby vehicle. Alternatively, the setting unit 112 may determine the intervehicle margin by using a time to collision (i.e. TTC) between the vehicle 10 and the nearby vehicle which is determined based on the vehicle information.

In the above-described embodiments, the setting unit 112 may correct the intervehicle margin depending on at least one of the size and the weight of the vehicle 10. The size of the vehicle 10 includes vehicle length and vehicle width. For example, the setting unit 112 corrects the intervehicle margin, when the size of the vehicle 10 is large, such that the timing at which the travelling speed of the vehicle 10 is changed during the lane change, to be delayed compared to a case where the size of the vehicle 10 is small. Thus, variation between the intervehicle margins caused by sizes of vehicles is corrected, whereby the travelling speed can be changed at an appropriate timing. Note that the setting unit 112 may correct the intervehicle margin in accordance with type of vehicle 10 such as large-sized vehicle or middle-sized vehicle.

In the above-described embodiments, the setting unit 112 may determine the traveling speed of the vehicle during the lane change by using the lane information stored in the lane information storing unit 130, which is related to the lane at the vehicle position detected by the vehicle position sensor 126. For example, the setting unit 112 determines, depending on the lane information of the lane before/after the vehicle 10 changes lane, a setting of whether an acceleration operation or a deceleration operation is performed. More specifically, the setting unit 112, at step S120, is able to set the control such that the vehicle decelerates when the lane before changing the travelling lane is a passing lane and when the lane after changing the travelling lane is a driving lane, and sets the control such that the vehicle accelerates when the lane before changing the travelling lane is a driving lane and when the lane after changing the travelling lane is a passing lane.

In the above-described embodiments, the driving control unit 113 may control the vehicle 10 to follow an object vehicle travelling ahead of the vehicle 10, and changes a timing for switching the object vehicle to be a preceding vehicle on the lane after changing the travelling lane, thereby controlling a timing of changing the travelling speed of the vehicle 10. For example, the driving control unit 113 may control a switching timing to be delayed, thereby making the deceleration timing delay, the switching timing is a timing for switching the object vehicle to be a preceding vehicle on the lane after changing the travelling lane (i.e. post change lane), of which the travelling speed is lower than that of a preceding vehicle on the lane before changing the travelling lane (i.e. pre-change lane). Further, the driving control unit 113 may change the intervehicle distance after changing the travelling lane, thereby controlling the timing at which the travelling speed of the vehicle 10 is changed. For example, the intervehicle distance is narrowed whereby the deceleration timing can be delayed.

The present disclosure is not limited to the above-described embodiments, and can be modified in various manners without departing the scope of the present disclosure. Moreover, a plurality of functions included in a single element of the above-described embodiments may be achieved by a plurality of elements, or one function included in a single element may be achieved by a plurality of elements. A plurality of functions included in a plurality of elements may be achieved by a single element, or a function achieved by a plurality of elements may be achieved by a single element. Also, a part of configurations of the above-described embodiments can be omitted. At least part of the above-described configuration may be added to other configuration of the above-described embodiments, or may replace other configuration of the above-described embodiments. It should be noted that various aspects inherent in the technical ideas identified by the scope of claims are defined as embodiments of the present disclosure.

Conclusion

As described above, the present disclosure has been achieved in light of the above-described circumstances and provides a vehicle control apparatus capable of changing the travelling speed of the vehicle in a timely manner during a lane change operation.

According to one aspect of the present disclosure, a vehicle control apparatus performing an automatic driving of a vehicle is provided. The vehicle control apparatus includes: a vehicle information acquiring unit that acquires vehicle information related to a nearby vehicle; a setting unit that sets an intervehicle margin between the vehicle and the nearby vehicle by using the vehicle information, and determines a change timing of a travelling speed of the vehicle depending on the intervehicle margin; and a driving control unit that performs in a lane change operation, a control of changing the travelling speed of the vehicle at the change timing, and a control of an intervehicle distance between the vehicle and a preceding vehicle of the vehicle after the lane change operation.

According to the vehicle control apparatus of the above-described aspect, since the timing for changing the travelling speed of the vehicle in the lane change operation is determined depending on the intervehicle margin which is set using the vehicle information related to the nearby vehicle, the travelling speed of the vehicle in the lane change operation can be changed in timely manner.

What is claimed is:

1. A vehicle control apparatus performing automatic driving of a vehicle comprising:

a vehicle information acquiring unit that acquires vehicle information related to a nearby vehicle;

a setting unit that sets an intervehicle margin between the vehicle and the nearby vehicle by using the vehicle information, and determines a change timing of a travelling speed of the vehicle depending on the intervehicle margin; and a driving control unit that performs, in a lane change operation, a control of changing the travelling speed of the vehicle at the change tinning, and a control of an intervehicle distance between the vehicle and a preceding vehicle of the vehicle after the lane change operation, wherein the nearby vehicle is a preceding vehicle travelling ahead of the vehicle on a travelling lane after the lane change operation of the vehicle; and the setting unit sets, when the intervehicle margin is larger than or equal to a threshold, a deceleration timing to be delayed compared to a case where the intervehicle margin is smaller than the threshold.

2. The vehicle control apparatus according to claim 1, wherein the intervehicle margin is determined by using at least one of the travelling speed of the vehicle, the intervehicle distance between the vehicle and the nearby vehicle, a relative speed between the vehicle and the nearby vehicle, and a relative acceleration factor between the vehicle and the nearby vehicle.

3. The vehicle control apparatus according to claim 1, wherein the setting unit corrects the intervehicle margin depending on at least one of size of the vehicle and a weight of the vehicle.

4. The vehicle control apparatus according to claim 1, wherein the setting unit determines, depending on lane information of the travelling lane before/after the lane change operation of the vehicle, a setting of whether an acceleration operation or a deceleration operation is performed.

5. The vehicle control apparatus according to claim 4, wherein the setting unit sets a control such that the vehicle decelerates in the lane change operation, when the travelling lane before the lane change operation is a passing lane and when the travelling lane after the lane change operation is a driving lane, and sets the control such that the vehicle accelerates in the lane change operation when the travelling lane before the lane change operation is a driving lane and when the travelling lane after the lane change operation is a passing lane.

6. The vehicle control apparatus according to claim 1, wherein the driving control unit controls the vehicle to follow an object vehicle travelling ahead of the vehicle, and changes a timing for switching the object vehicle to be a preceding vehicle on the travelling lane after the lane change operation, thereby controlling a timing of changing the travelling speed of the vehicle.

7. The vehicle control apparatus according to claim 1, wherein the driving control unit changes the intervehicle distance after the lane change operation, thereby controlling a timing of changing the travelling speed of the vehicle.

8. A vehicle control apparatus performing automatic driving of a vehicle comprising:

a vehicle information acquiring unit that acquires vehicle information related to a nearby vehicle;

a setting unit that sets an intervehicle margin between the vehicle and the nearby vehicle by using the vehicle information, and determines a change timing of a travelling speed of the vehicle depending on the intervehicle margin; and a driving control unit that performs, in a lane change operation, a control of changing the travelling speed of the vehicle at the change tinning, and a control of an intervehicle distance between the vehicle and a preceding vehicle of the vehicle after the lane change operation, wherein the nearby vehicle is a following vehicle travelling behind the vehicle on a travelling lane after the lane change operation of the vehicle; and the setting unit sets, when the intervehicle margin is smaller than a threshold, a deceleration timing to be delayed compared to a case where the intervehicle margin is larger than or equal to the threshold.

9. A vehicle control apparatus performing automatic driving of a vehicle comprising:

a vehicle information acquiring unit that acquires vehicle information related to a nearby vehicle;

a setting unit that sets an intervehicle margin between the vehicle and the nearby vehicle by using the vehicle information, and determines a change timing of a travelling speed of the vehicle depending on the intervehicle margin; and a driving control unit that performs, in a lane change operation, a control of changing the travelling speed of the vehicle at the change tinning, and a control of an intervehicle distance between the vehicle and a preceding vehicle of the vehicle after the lane change operation, wherein the nearby vehicle is a following vehicle travelling behind the vehicle on a travelling lane before the lane change operation of the vehicle; and the setting unit sets, when the intervehicle margin is smaller than a threshold, a deceleration timing to be delayed compared is to a case where the intervehicle margin is larger than or equal to the threshold.

* * * * *